(12) United States Patent
Berthaud et al.

(10) Patent No.: US 7,359,378 B2
(45) Date of Patent: Apr. 15, 2008

(54) SECURITY SYSTEM FOR PREVENTING UNAUTHORIZED PACKET TRANSMISSION BETWEEN CUSTOMER SERVERS IN A SERVER FARM

(75) Inventors: Jean-Marc Berthaud, Villeneuve Loubet (FR); Pascal Chauffour, Cagnes sur Mer (FR); Patrick Gayrard, Cagnes sur Mer (FR); Eric Lebrun, Carros (FR)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 10/263,213

(22) Filed: Oct. 2, 2002

(65) Prior Publication Data

US 2003/0072307 A1 Apr. 17, 2003

(30) Foreign Application Priority Data

Oct. 11, 2001 (EP) ................................ 01480098

(51) Int. Cl.
*H04L 12/56* (2006.01)
*H04L 9/00* (2006.01)

(52) U.S. Cl. .......................................... 370/389; 726/2
(58) Field of Classification Search ................ 726/2, 726/3, 4, 11, 13, 21; 370/389, 401; 709/223, 709/224, 225
See application file for complete search history.

(56) References Cited

U.S. PATENT DOCUMENTS 5,774,660 A 6/1998 Brendel et al. ........ 395/200.31
6,006,264 A * 12/1999 Colby et al. ................. 709/226
6,335,935 B2 * 1/2002 Kadambi et al. ........... 370/396
6,434,618 B1 * 8/2002 Cohen et al. ................ 709/228

(Continued)

FOREIGN PATENT DOCUMENTS

EP 0 892 531 A2 1/1999

(Continued)

OTHER PUBLICATIONS

Cisco Systems, Redirecting Debugging and Error Message Output, Copyright 1989-1997, pp. 5-7☐☐☐☐http://www.cisco.com/univercd/cc/td/doc/product/software/ios11/dbook/dintro.htm.*

(Continued)

*Primary Examiner*—Hassan Kizou
*Assistant Examiner*—Betty Lee
(74) *Attorney, Agent, or Firm*—Ron Kaschak Hoffman, Warnick & D'Alessandro LLC

(57) ABSTRACT

A security system for a communication system that includes an IP network and groups of servers in a farm, wherein each group is associated with a customer. A user connected to the network can access information provided by a customer from a server within the group of servers associated with this customer through a dispatching device. The security system comprises setting means in each of the switches which are located between the dispatching device and the customer servers for setting a field of bits in the IP header of potentially irregular packets transmitted from a customer server and the dispatching device, means in the dispatching device for identifying any packet wherein the field of bits has been set to the predefined value, and means for deleting or logging the potentially irregular packet when the destination of the packet is not the dispatching device.

7 Claims, 2 Drawing Sheets

U.S. PATENT DOCUMENTS

| | | | |
|---|---|---|---|
| 7,031,310 B2* | 4/2006 | Ando et al. | 370/392 |
| 7,200,865 B1* | 4/2007 | Roscoe et al. | 726/12 |
| 7,203,190 B1* | 4/2007 | Ruban et al. | 370/356 |
| 2002/0107961 A1* | 8/2002 | Kinoshita | 709/225 |
| 2003/0005116 A1* | 1/2003 | Chase et al. | 709/225 |

FOREIGN PATENT DOCUMENTS

| | | |
|---|---|---|
| WO | WO 99/33227 | 7/1999 |

OTHER PUBLICATIONS

Cisco Systems, Comp.Dcom.Sys.Cisco Frequently Asked Questions (FAQ), pg. 7, Question 9□□□□http://www.faqs.org/faqs/cisco-networking-faq/.*

Cisco Systems, Comp.Dcom.Sys.Cisco Frequently Asked Questions (FAQ), p. 7, Question 9 http://www.faqs.org/faqs/cisco-networking-faq/.*

* cited by examiner

SECURITY SYSTEM FOR PREVENTING UNAUTHORIZED PACKET TRANSMISSION BETWEEN CUSTOMER SERVERS IN A SERVER FARM

TECHNICAL FIELD

The present invention relates to communication systems wherein WEB servers associated with customers are hosted in a server farm connected to the Internet network and relates in particular to a security system for preventing unauthorized packet transmission between customer servers.

BACKGROUND

Today, a server farm is a physical location having a scalable infrastructure and all the facilities and resources, enabling the users connected to the Internet network to easily access a number of services provided by a plurality of customers. Generally, the resources are located in premises owned by a data processing equipment provider such as IBM.

Most server farms are used today to host WEB servers of several customers. The architecture of such a server farm includes a local network to which are connected the customer servers and an Internet front-end connecting this local network to the Internet network. Such a local network includes different layers of components such as switches and firewalls through which the requests from the users connected to the Internet network are routed.

Generally, there are a plurality of servers which are associated with one or more customers, where several servers associated with a customer constitute a group or cluster of servers. In this case, the local network is connected to the customer servers through a dispatching device in charge of dispatching the requests from the users to the appropriate customer server. The function of the dispatching device is not only to send the user requests to the right cluster of servers if there is more than one cluster, but also to select a server in the cluster in accordance with load balancing rules. Such a solution is preferable to using hardware and software dedicated to each customer, a solution which is too expensive. Nevertheless, this shared solution results in the risk that one of the customers impacts the other customers unless appropriate features for sharing are included in the system.

A dispatching device presents all the characteristics of a router (that is to route packets based on the IP address or other IP packet characteristics) without the typical port-related security filtering features known as access lists that exist with most true routers. Therefore, the use of such a dispatching device results in a security breach in that this configuration allows one customer server to access another customer server through the dispatching device. Note that there may be a normal flow between customer servers and the dispatching device used by the load balancing algorithms to check the presence or the load of the servers.

Several approaches could be used to remedy the above drawback. A first approach would consist of forbidding any traffic whose source address matches with some other customer's characteristics, for example by setting list controls in the ports of the switches sending traffic to a customer server. This approach is inefficient since source addresses can be faked by the originating server, and would necessitate modification of each access list of other ports when a new customer is added.

A second approach consists of forbidding any traffic whose destination characteristics match with some other customer's characteristics by setting list controls in the ports of the switches located between the customer servers and the dispatching device. A drawback of this approach is that each time a new customer server is added, each access list for all the other ports connected to the other servers (of the other customers or the same customer) must be updated.

A third approach would consist of allocating in advance customer space characteristics so that all can be configured at once and the same configuration can be applied to each new addition. A drawback of this approach is that it is difficult to pre-allocate resources in this environment since these resources must correspond to the maximum requirements thereby resulting in a very important cost.

SUMMARY

Accordingly, an object of the invention is to implement a security system that prevents unauthorized traffic between the customer servers in a server farm.

Another object of the invention is to provide a system which uses always the same configuration at the level of each customer server, which is automatable, and which does not imply any maintenance or any management or pre-allocation of resources.

The invention relates therefore to a security system in a communication system including an IP network and a plurality of groups of servers in a server farm. Each group is associated with a customer. A user connected to the IP network can access information provided by a customer from a server within the group of servers associated with this customer through a dispatching device adapted to select a server amongst the servers of this group of servers according to a predefined algorithm. The dispatching device is connected to the servers through switches adapted to control the data transmission exchanged between the dispatching device and the servers. The security system comprises setting means in each switch for setting a field of bits in the IP header of potentially irregular packets transmitted from a customer server and dispatching device, identifying means in the dispatching device for identifying any packet wherein the field of bits has been set to such a predefined value, and disposing means for deleting or logging the potentially irregular packet as being an irregular packet when the destination of such a packet is not the dispatching device.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION

Figure 1:
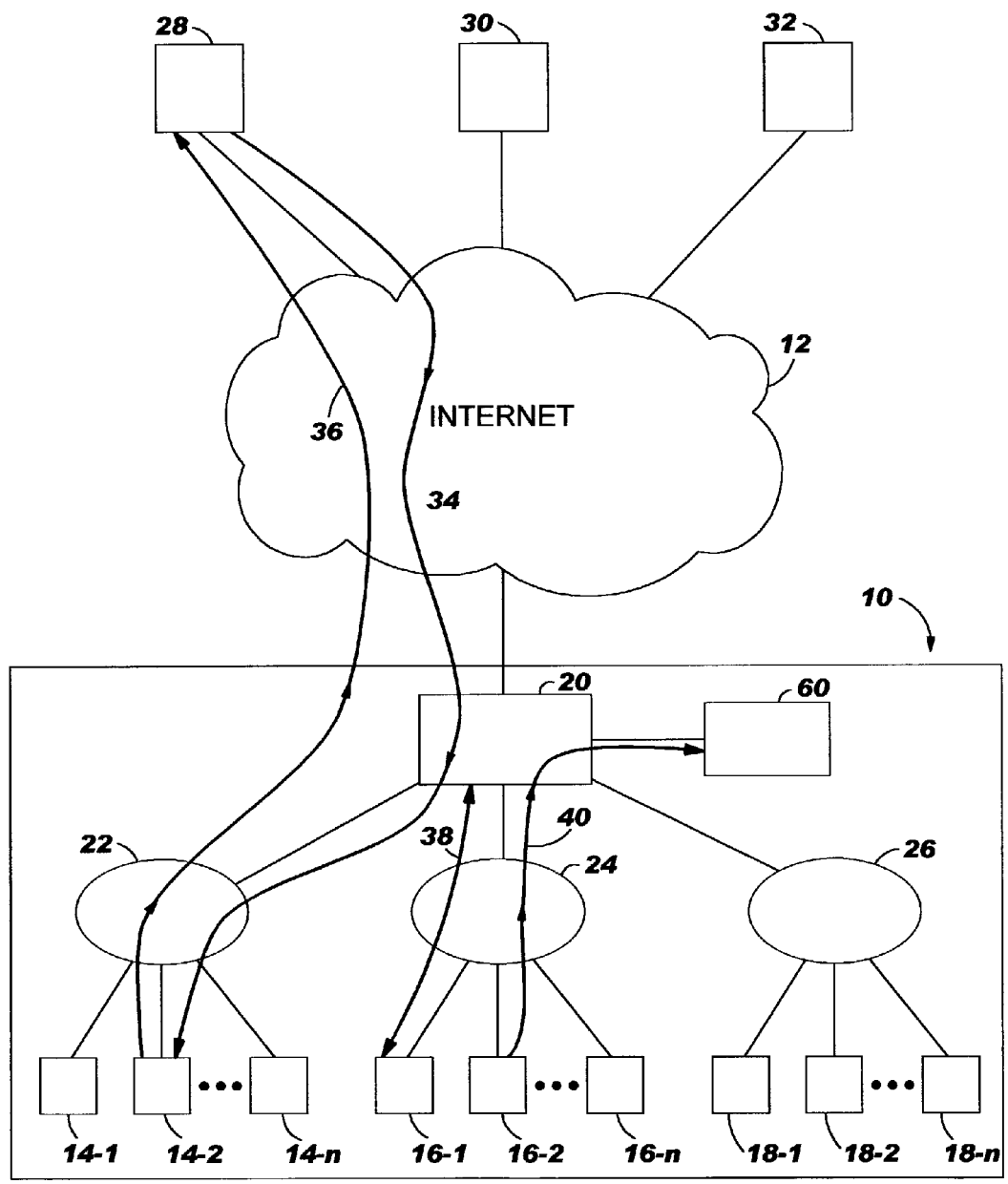
FIG. 1 is a schematic block-diagram representing a server farm wherein a security system according to the invention is implemented.

A system according to the invention may be implemented in the context illustrated in FIG. 1 wherein a server farm 10 is connected to the Internet network 12 (or any other Intranet network). Several groups of customer servers are hosted in server farm 10 such as groups 14, 16, 18 including respectively customer servers 14-1, 14-2, . . . 14-n, customer servers 16-1, 16-2, . . . 16-n and customer servers 18-1, 18-2, . . . 18-n. These groups of customer servers are connected to a dispatching device 20 through respectively switch 22, switch 24 and switch 26.

A plurality of users 28, 30, 32 connected to the Internet network 12 can send requests to the customer servers in order to get information. Each request is received by dispatching device 20 which selects the customer server to which the request is forwarded by using a load balancing algorithm. Thus, assuming that a user 28 sends a request represented by request line 34 in FIG. 1 to get information from the customer associated with servers 14-1, 14-2, . . . 14-n, dispatching device 20 can select customer server 14-2. Then, customer server 14-2 answers back to the user by forwarding the answer directly to Internet network 12 as shown by answer line 36. Note that, depending upon the implementation, the answer could be forwarded to the Internet network by passing through the dispatching device. Note also that all downward or upward information pass always through a switch (e.g. Switch 22) whatever the implementation is.

In parallel, dispatching device 20 has periodic exchanges of information with the customer servers in order to determine their state (for example, up/down, load, and response time). Thus, the exchange of information with customer server 16-1 is represented in FIG. 1 by double arrow line 38.

Assuming now that a customer wants to access the information belonging to another customer (thus creating a security breach), it sends the request from a customer server such as the request line 40 from customer server 16-2. But, contrary to the information sent back to a user in response to a request or the periodic information exchanged between the dispatching device and the customer server for status purpose, the data packets received by the dispatching device are not forwarded to the destination indicated therein. These packets are deleted or logged as explained hereafter in accordance with the invention.

Figure 2:
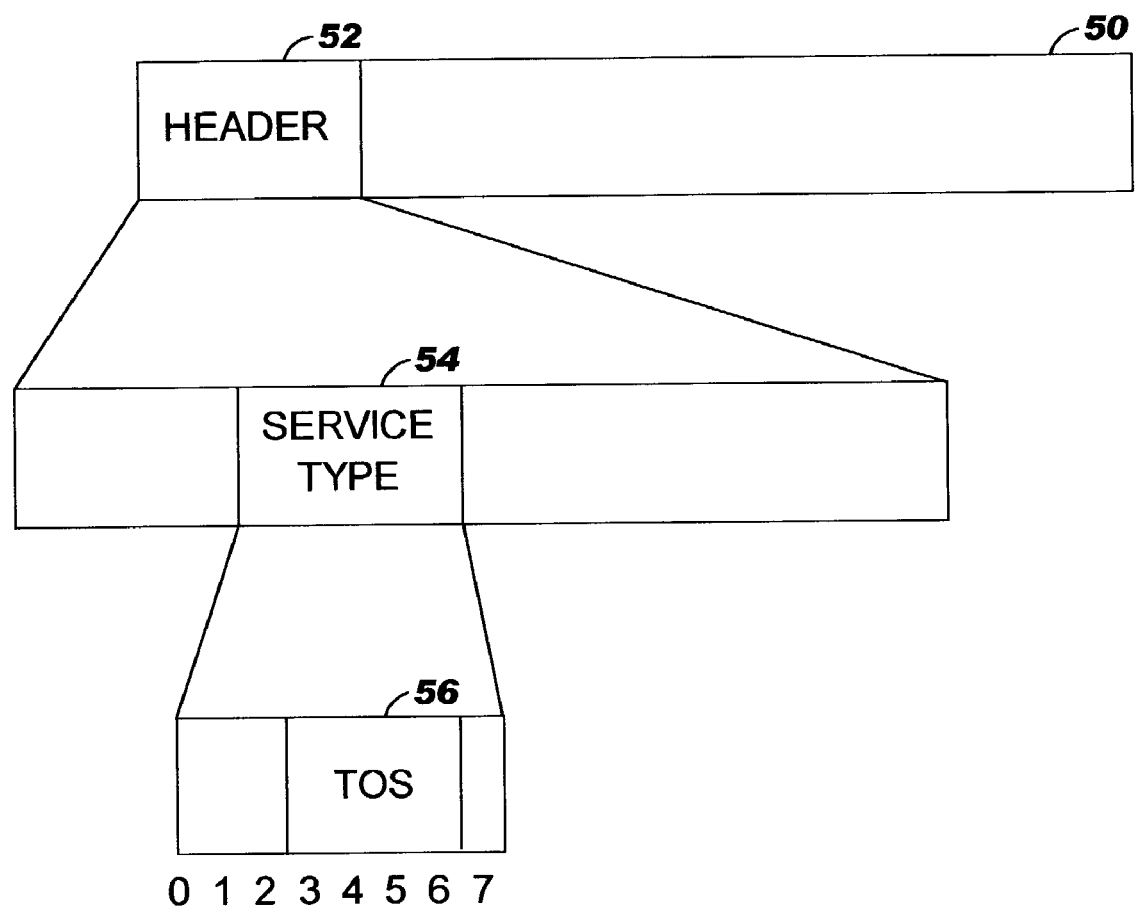
FIG. 2 illustrates the IP header of a packet wherein the TOS bits are used to implement the invention.

The essence of the invention consists in "twisting" the usage of a common location in each data packet. As illustrated in FIG. 2, each data packet 50 includes an IP header 52. The header 52 contains a specific field 54 including the service type which is one byte long. Such a field includes a subfield 56 of four TOS bits which can be used to indicate that the data packet is a potentially irregular packet.

Such a potentially irregular packet is by definition any packet coming from a customer server. A simple access list rule written in the input side of each switch port linked to a customer server sets the TOS bits of this packet to a predefined value. For instance, in the case illustrated by double arrow line 40 from customer server 16-2, the TOS bits are set to a predefined value when the packet is received at the input port of switch 24 connected to customer server 16-2. Note that the field to be set to such a predefined value could be any other field in the IP header.

When a potentially irregular packet is received by dispatching device 20, it is identified as being either a packet being part of the periodical information exchanged with the customer server (its destination address is the dispatching device) or an irregular packet (its destination address is a customer server). In such a case, disposing means are provided for directly deleting such a packet or logging the packet in order to signal the breach and the origin thereof. For this, the packet can be sent to a logging device 60 as illustrated in FIG. 2. Note that the logging function could be included in dispatching device 20.

It should be noted that, in a case where the destination of the marked irregular packets matches some other rule set into the dispatching device which would take precedence over the rule of "twisting" the TOS bits by configuration error, an access list control can be set at the input port of the switch linked to the dispatching device which should identify also any packet having the TOS field set to the predefined value and drop any packet that fits with it. This may be done when no packet is likely to come from the Internet with its TOS bits set to the chosen value to identify irregular packets.

We claim:

1. A security system in a communication system including an IP network and a plurality of groups of servers in a server farm, each of said groups being associated with a customer, and wherein a user connected to said IP network can access information provided by a customer from a server within the group of servers associated with said customers through a dispatching device adapted to select a server amongst the servers of said group of servers according to a predefined algorithm, said dispatching device being connected to the servers through switches adapted to control the data transmission exchanged between said dispatching device and said servers, said security system comprising:

setting means in each one of said switches for setting, to a predefined value, a field of bits in an IP header of a potentially irregular packet transmitted from a customer server;

identifying means in said dispatching device for identifying any packet wherein said field of bits has been set to said predefined value;

relaying means for relaying a packet from a server in the server farm to a user via the Internet in the case that the packet is not identified as a potentially irregular packet; and disposing means for disposing said potentially irregular packet as being an irregular packet because the destination of such a packet is a server in the server farm.

2. The security system according to claim 1, wherein said field of bits in the IP header is the TOS bits field.

3. The security system according to claim 1, wherein a destination of the potentially irregular packet includes a server in the server farm.

4. The security system according to claim 1, wherein said disposing means are within said dispatching device and are used to delete any packet considered to be an irregular packet.

5. The security system according to claim 1, further comprising a logging device connected to said dispatching device for logging any packet considered to be an irregular packet.

6. The security system according to claim 5, wherein said setting means are located in each one of said switches at the input ports linked to said customer servers.

7. The security system according to claim 1, wherein input ports of said switches which are linked to said dispatching device include also setting means for setting said field of bits in the IP header of any potentially irregular packet transmitted from said dispatching device and a customer server.

* * * * *